(No Model.)

R. F. IVEY.
Moth Trap.

No. 239,503. Patented March 29, 1881.

WITNESSES:
C. Neveux
C. Sedgwick

INVENTOR:
R. F. Ivey
BY Munn & Co.
ATTORNEYS.

UNITED STATES PATENT OFFICE.

ROBERT F. IVEY, OF WILLIAMSBURG, GEORGIA.

MOTH-TRAP.

SPECIFICATION forming part of Letters Patent No. 239,503, dated March 29, 1881.

Application filed July 19, 1880. (No model.)

*To all whom it may concern:*

Be it known that I, ROBERT F. IVEY, of Williamsburg, in the county of Calhoun and State of Georgia, have invented a new and Improved Moth-Trap, of which the following is a specification.

The object of my invention is to provide a new and improved moth-trap to be placed in front of the openings or apertures of bee-hives for the purpose of trapping the moths as they attempt to enter the hive.

The invention consists in a box or receptacle provided with two tubes, one inside of the other, the inner one passing through the box into the hive, whereas the outer one leads into the box, so that the moths that are not able to get at the inner tube must pass into the box, whereas the bees pass through the inner tube directly into the hive.

Figure 1:
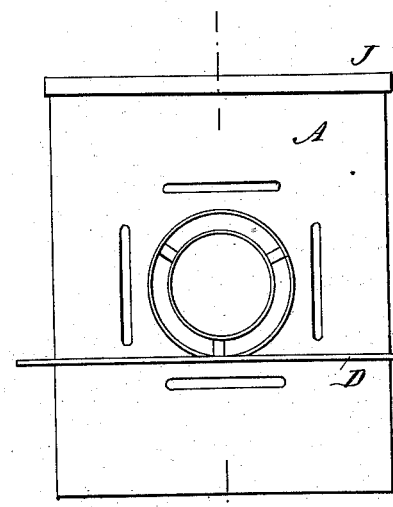
Figure 2:
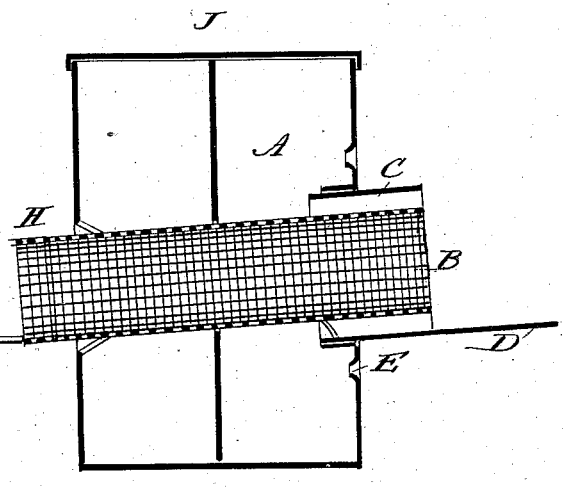
Figure 3:
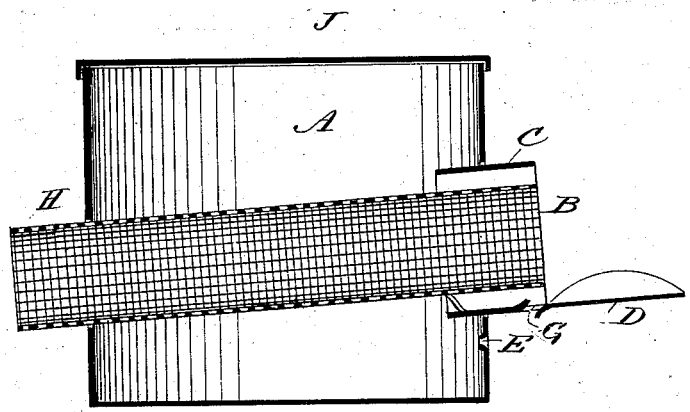

In the accompanying drawings, Figure 1 is a front elevation of my improved bee-moth trap. Fig. 2 is a cross-sectional elevation of the same on the line $x\,x$, Fig. 1. Fig. 3 is a cross-sectional elevation of a modification of the same.

Similar letters of reference indicate corresponding parts.

The box or receptacle A is provided with an aperture in the front and rear, through which apertures a tube, B, preferably of perforated metal, passes. The front end of the tube B is surrounded by a short piece of tube, C, which is of greater diameter than the tube B, but only projects into the box A a very short distance. A transverse plate, D, or like device upon which the bees can alight, is attached to the bottom of the outward end of the short tube C, as is shown. The box, which may be of any desired shape, is provided with an opening, E, to permit water to flow off in case too much of it has collected.

If desired, the tube C may be provided with an aperture, G, below the tube B, and outside of the box A.

The rear end, H, of the tube B, is held to the box by a number of prongs stamped out of the sides of the box, so that the moths can also enter the box from the rear. The box is provided with a removable top, J.

The end H of the tube B is passed into the main aperture of the hive, and the joint is packed with the greatest care, all the other crevices and cracks in the hive having been previously stuffed. A small quantity of water, sweetened with sugar or honey or any other suitable bait, is placed in the box A. The bees can enter into the hive by passing through the tube B, whereas the moth-flies crawl along the tube C, as they cannot get at the tube B, and fall into the box A. If the tube C is provided with the aperture G they will fall through the said aperture; but if they should succeed in passing the said aperture, they would drop into the box A without fail.

If desired, the tube C may be dispensed with, and only the shelf D may be arranged below the outer end of the tube B.

Having thus described my invention, what I claim as new, and desire to secure by Letters Patent, is—

The combination, with the box A, of the perforated tube B, passing therethrough, the larger but shorter surrounding tube C, and the plate D, attached to the bottom of the outer end of the tube C, the said parts constructed and arranged to form a moth-trap adapted to be connected with a bee-hive, as shown and described.

ROBERT F. IVEY.

Witnesses:
W. W. GLADDEN,
L. D. CARTLEDGE.